United States Patent [19]

Cops et al.

[11] 4,133,326

[45] Jan. 9, 1979

[54] FUEL CONTROL SYSTEM FOR AN INTERNAL COMBUSTION ENGINE

[75] Inventors: Michael H. Cops, Solihull; Clive R. Sainsbury, Birmingham, both of England

[73] Assignee: Lucas Industries, Ltd., Great Britain

[21] Appl. No.: 733,680

[22] Filed: Oct. 18, 1976

[30] Foreign Application Priority Data

Oct. 22, 1975 [GB] United Kingdom ............... 43281/75

[51] Int. Cl.[2] .......................... F02B 3/00; G06F 15/50

[52] U.S. Cl. ......................... 123/119 EC; 123/32 EE; 123/32 EC

[58] Field of Search ....... 123/119 EC, 32 EE, 32 EC, 123/32 EB, 32 EJ, 32 EI; 60/276, 285

[56] References Cited

U.S. PATENT DOCUMENTS

| | | | |
|---|---|---|---|
| 3,570,460 | 3/1971 | Rabus | 123/32 EI |
| 3,596,640 | 8/1971 | Bloomfield | 123/32 EI |
| 3,612,013 | 11/1969 | Gambill | 123/32 EI |
| 3,703,162 | 11/1972 | Aono | 123/32 EI |
| 3,735,742 | 5/1973 | Aono et al. | 123/32 EI |
| 3,742,920 | 7/1973 | Black | 123/32 EI |
| 3,871,338 | 3/1975 | Schmidt et al. | 60/285 |
| 3,906,207 | 9/1975 | Rivere et al. | 123/32 EE |
| 3,927,304 | 12/1975 | Wentworth et al. | 123/32 EE |
| 3,938,479 | 2/1976 | Oberstadt | 123/32 EE |
| 4,031,866 | 6/1977 | Asano | 123/32 EB |

*Primary Examiner*—Charles J. Myhre
*Assistant Examiner*—Raymond A. Nelli
*Attorney, Agent, or Firm*—J. Rodman Steele, Jr.

[57] ABSTRACT

A fuel control system for an internal combustion engine, including a fuel flow control sensitive to one or more engine operating parameters and controlling the rate at which fuel is introduced into the engine, an exhaust gas sensing device for producing an output signal corresponding to the exhaust gas composition, feed back means for feeding back to the fuel flow control, a signal derived from said output signal to correct the fuel flow, said feed back means including a signal storage device, the signal stored in which is altered in accordance with variations in the output signal of the exhaust gas sensing device, and overrun detection means connected to said feed back means and arranged to prevent alteration of said stored signal by the exhaust gas sensing device during overrun.

8 Claims, 6 Drawing Figures

FUEL CONTROL SYSTEM FOR AN INTERNAL COMBUSTION ENGINE

Figure 1:
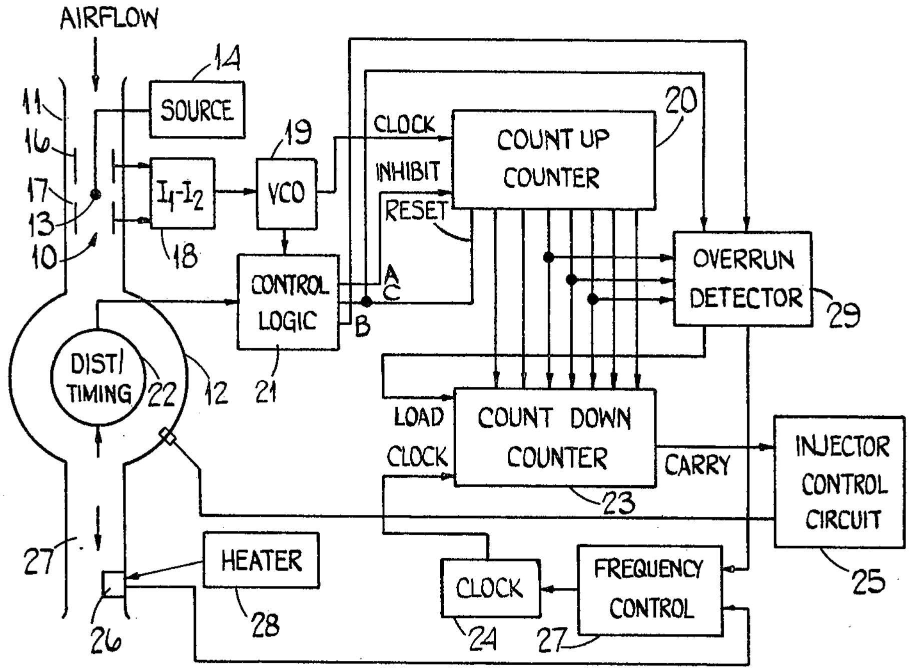

This invention relates to a fuel control system for an internal combustion engine.

The invention overcomes the inability of closed-loop fuel control systems to cope with the conditions of overrun, also known as engine-braking. Overrun occurs when a vehicle moves forward under its momentum, but the throttle or accelerator is not depressed. The vehicle is essentially coasting in gear.

It has already been proposed to include in a fuel control system an exhaust gas sensor which provides closed-loop control of the air/fuel ratio to the stoichiometric condition. With such a system when an overrun condition occurs it is desirable to override the closed-loop control because the signal produced by the sensor due to poor combustion is not truly representative of the ratios of air and fuel supplied to the engine. Consequently the control system will attempt to modify the quantity of fuel supplied until the sensor detects what it takes to be a stoichiometric condition. During overrun, therefore, the exhaust gas sensing circuit will detect this anomolous condition and provide a feedback signal tending to alter the fuel input. At the end of the overrun period, however, when normal closed-loop control is restored, the erroneous feedback signal now formed will tend to cause the mixture fed to the engine to become incorrect until the system lag is overcome. This could result, for a short time after overrunning, in a highly polluted exhaust emission.

It is an object of the invention to provide a closed-loop fuel control in which this disadvantage is overcome.

Broadly, the invention resides in a fuel control system for an internal combustion engine, including a fuel flow control sensitive to at least one engine operating parameter and controlling the rate at which fuel is introduced into the engine, an exhaust gas sensing device for producing an output signal corresponding to the exhaust gas composition, feedback means for feeding back to the fuel flow control, a signal derived from said output signal to correct the fuel flow, said feedback means including a signal storage device, the signal stored in which is altered in accordance with variations in the output signal of the exhaust gas sensing device, and overrun detection means connected to said feedback means and arranged to prevent alteration of said stored signal by the exhaust gas sensing device during overrun.

Preferably, said overrun detection means includes delay means connected to extend the period during which alteration of said stored signal is prevented for a predetermined length of time after the overrun condition has ceased.

The invention may be applied both to fuel injection systems (with either analog or digital electronic controls) and to carburettor systems.

In a digital electronic control system for fuel injection, the feedback means may include means for varying the frequency of a clock which clocks a counter periodically programmed with a count corresponding to the required amount of fuel per stroke. In this case the clock may be a voltage controlled oscillator the control voltage of which is supplied by an electronic analog integrator (the feedback capacitor of which constitutes said signal storage device) receiving an input from the exhaust gas sensor, the overrun detection means including switch means for disconnecting the exhaust gas sensor from the integrator.

In the case of an analog electronic control system for fuel injection the feedback control may likewise include an electronic analog integrator which receives its input from the exhaust gas sensor device, and the overrun detection means may include a switch means for disconnecting the integrator from this sensor device. In this case, however, the integrator would be arranged to control a controlled current source which discharges a capacitor periodically charged to a voltage corresponding to the fuel demand. Such a system (without the integrator in the feedback means) is described in our co-pending application no. 717,058, now abandoned.

In the carburettor system feedback is obtained in varying the air pressure in the float chamber of the carburetor. In one possible arrangement the exhaust gas sensor device causes a valve to connect a plenum chamber via an orifice to a vacuum source when the mixture is too rich and to atmosphere when the mixture is weak, the plenum chamber being connected to the carburetor float chamber. The plenum chamber acts in this case as the signal storage device and, in accordance with an aspect of the present invention the overrun detector means is arranged to close the connection of the sensor controlled valve to the plenum chamber during overrun. This may be achieved either by adding a further shut off valve controlled by the sensor or by utilizing a single valve with two solenoids for moving its control element to extreme positions connecting the plenum chamber to the vacuum source and to atmosphere respectively, and an off position which it occupies when both solenoids are de-energized, the overrun detection means effecting overriding de-energization of the solenoids.

Figure 2:
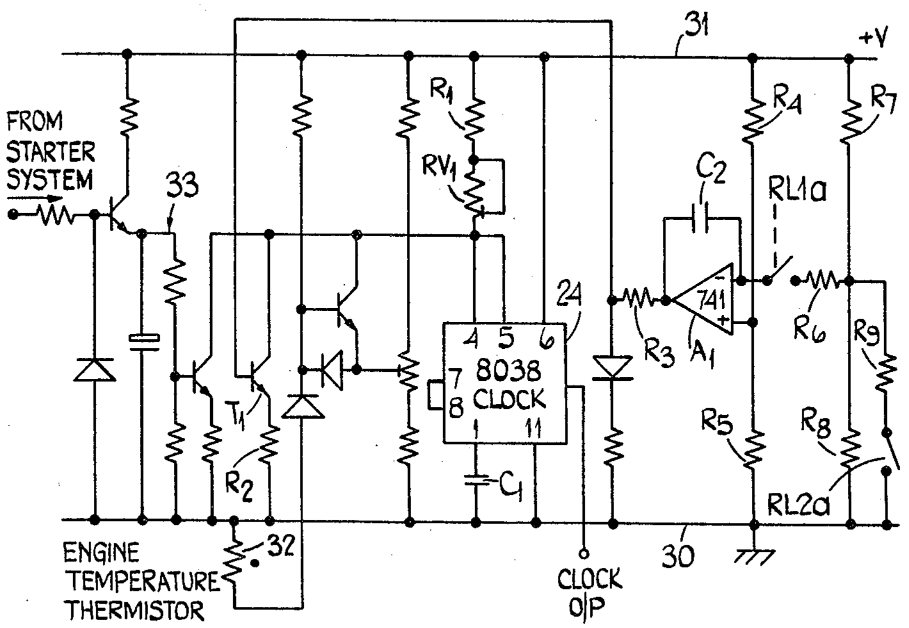
Figure 3:
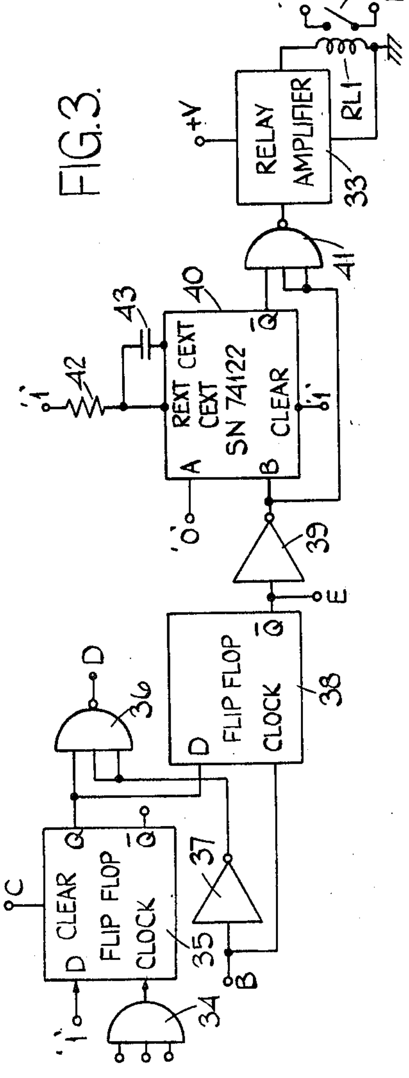
Figure 4:
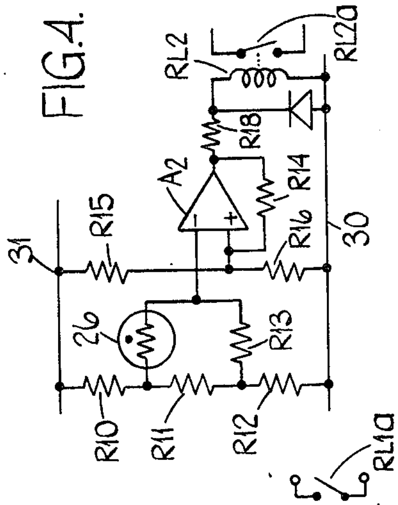

In the accompanying drawings,

FIG. 1 is a schematic diagram of one example of the invention as applied to a digital electronic controlled fuel injection system, FIG. 2 is a detailed circuit diagram of part of a feedback means included in the system of FIG. 1, FIG. 3 is a schematic diagram of an overrun detector forming part of the system shown in FIG. 1, FIG. 4 is a circuit diagram of an exhaust gas sensor device included in the system of FIG. 1

Figure 5:
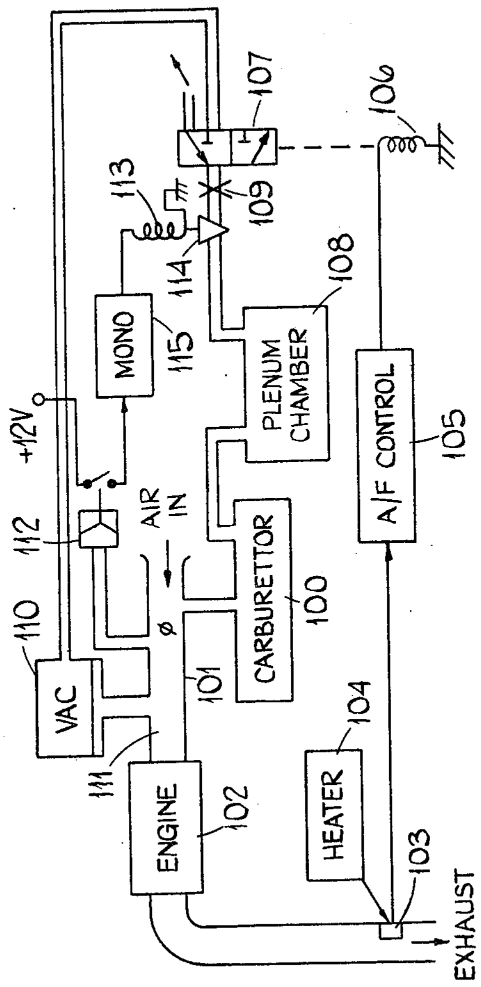
Figure 6:
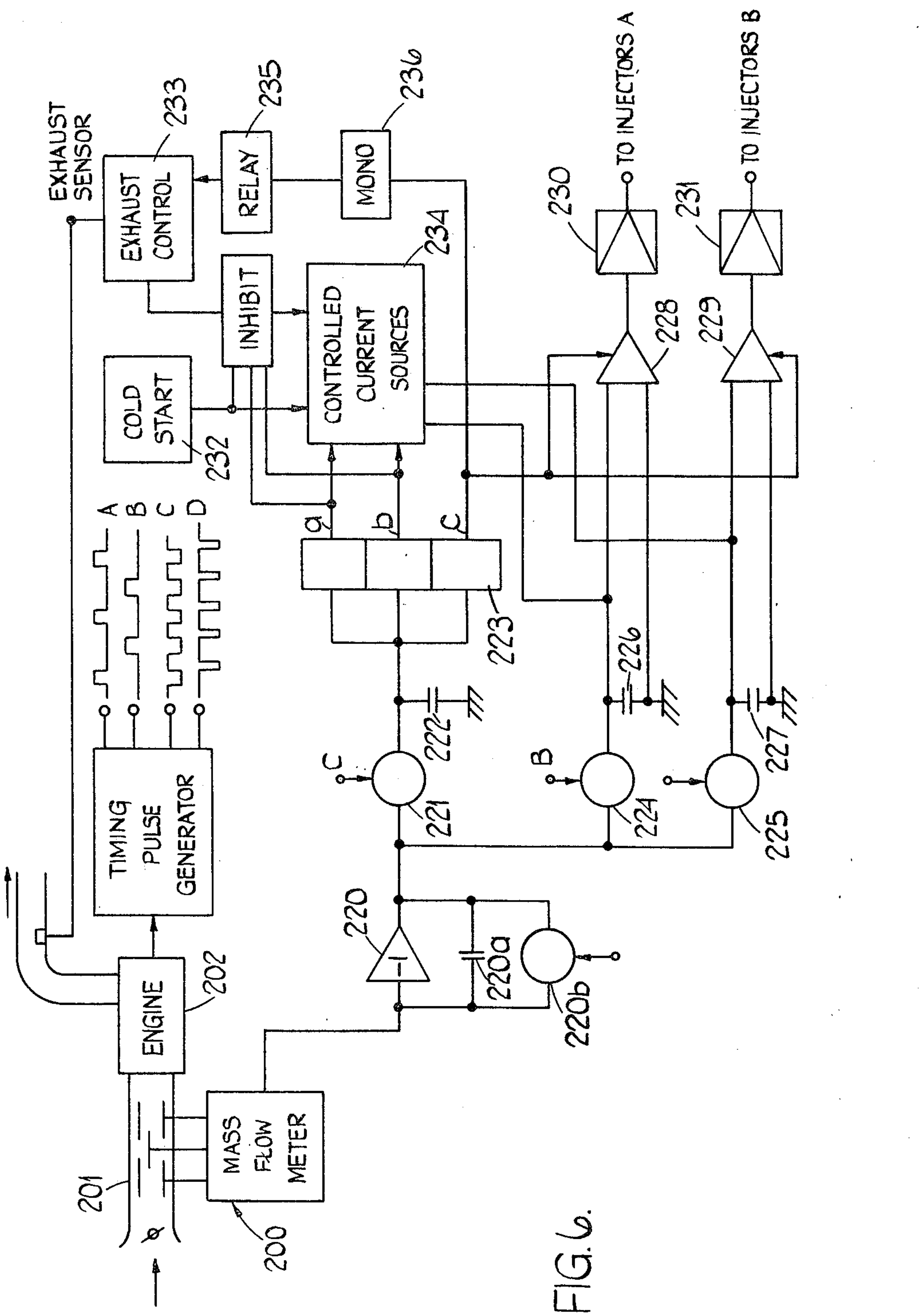

FIG. 5 is a schematic diagram of an example of the invention as applied to a carburetor system and FIG. 6 is a schematic diagram of a further example of the invention as applied to an analogue electronic controlled fuel injection system.

Referring firstly to FIG. 1 the system includes a known air mass flow measuring device 10 mounted in the air intake 11 of the engine 12. The device 10 includes an electrode 13 which is connected to a controlled high voltage source 14 and two collector electrodes 16, 17 the flow of current to which from the electrode 13 depends upon the air mass flow through the intake 11. A current differencing circuit 18 is connected to the two electrodes 16 and 17 and produces a voltage output dependent upon the difference between the current and hence upon the air mass flow. The voltage output from the circuit 18 is applied to a voltage controlled oscillator 19 the output of which is applied to the clock input of a count-up counter 20. The voltage controlled oscillator also applies pulses to a control logic circuit 21 which controls the inhibition and clearing of the count-up counter 20. The control logic circuit 21 also has an input connection from a distribution/timing device 22 on the engine 12, The circuit 21 utilizes the first three pulses from the oscillator 19 following each pulse from the device 22 to produce output pulses at terminals A, B and C respectively. Terminal A is connected to the INHIBIT terminal of the counter 20 and terminal C is connected to the RESET terminal of counter 20. A second counter 23 is connected as a presettable count-down counter so that when a pulse is received at the LOAD terminal of the counter 23 the count currently in the counter 20 will be transferred to the counter 23 in well known manner. A clock 24 is connected to the clock input terminal of the counter 23 so that, in each cycle of operation, the time taken to count out the count transferred to the counter 23 will depend both upon the value of the count transferred and upon the frequency of the clock. For the duration of this count-out period, in known manner, the counter 23 supplies a signal to an injector control circuit 25 which controls the injection of fuel into the engine, the amount of fuel injected in each engine cycle depending upon this count-out period.

The system includes an exhaust feedback arrangement making use of an exhaust gas sensor 26 in the exhaust pipe 27 of the engine. This, in known manner, has a heater 28 and the resistance of the sensor (which is electrically isolated from the heater) varies in accordance with the concentration of the oxygen or carbon-monoxide in the exhaust gas. The sensor 26 is connected to a clock frequency control 27 so that if, for example, there is an excess of oxygen in the exhaust (indicating that the mixture supplied to the engine is too lean) the clock frequency will be decreased to increase the amount of fuel injected per cycle. Conversely if the oxygen content is too low the fuel supplied will be increased.

The system further includes an overrun detector circuit 29 which has connections from terminals B and C the control logic circuit 21 and also from the outputs of the count-up counter 20. The overrun detector 29 is connected to the frequency control 27 as will be described in more detail hereinafter and also supplies the LOAD terminal of the counter 23.

Turning now to FIG. 2 there is shown therein, in some detail, the clock and its frequency control circuit. The clock itself is a type 8038 integrated circuit having its terminal 1 connected by a capacitor C1 to an earth rail 30 and its terminal 11 connected directly to the earth rail 30. Terminals 7 and 8 are interconnected and terminals 4 and 5 are connected via a variable resistor RV1 and a resistor R1 in series to a positive supply line 31. Terminal 6 of the clock is connected directly to the supply line 31. Frequency control is effected by varying the voltage at terminal 4 of the clock as will be hereinafter described.

For such frequency variation there are several variables including an engine temperature measuring thermistor 32 and an engine start-up circuit 33 neither of which are directly pertinent to the present invention and which will not, therefore, be described in detail. As regards the present invention which is primarily concerned with the question of exhaust gas sensor feedback to the clock 24 thereis an n-p-n transistor T1 having its collector connected to terminal 4 of the clock 24 and its emitter connected via a resistor R2 to the rail 30. The base of the transistor T1 is connected via a resistor R3 to the output terminal of an operational amplifier A1 connected as an integrator having a feedback capacitor C2. The non-inverting input terminal of the amplifier A1 is connected to the common point of two resistors R4, R5 connected between the rails 30, 31 and the inverting input terminal of the amplifier A1 is connected via a relay contact RL1*a* to a resistor R6 the other end of which is connected to the common point of two bias resistors R7, R8 connected in series between the rails 30, 31 and also via a resistor R9 to a further relay contct RL2*a* which connects the resistor R9 to the rail 30 when closed.

The relay contact RL1*a* is operated by a relay coil RL1 shown in FIG. 3, the relay RL1 being operated by an amplifier 33. FIG. 3 in fact, shows the overrun detector circuit 29 in detail and this detector circuit simply consists of an AND gate 34, a first flip-flop 35, a NAND gate 36 an inverter 37, a second flip-flop 38 a further inverter 39, a retriggerable monostable circuit 40 and a further NAND gate 41. Both flip-flops are of the type known as D-type flip-flops and the flip-flop 35 has its CLEAR terminal connected to an output terminal of the logic circuit 21 which is also connected to the RESET terminal of the counter 20. The D input terminal of the flip-flop 35 is permanently connected to a logical 1 and the output terminal of the AND gate 34 is connected to the clock terminal of the flip-flop 35. The AND gate 34 has three input terminals connected to three of the output terminals of the counter 20.

The Q output terminal of the flip-flop 35 is connected to one input terminal of the NAND gate 36 the other input terminals of which are connected via the inverter 37 to an output terminal B of the logic circuit 21. This B terminal is also connected to the clock terminal of the flip-flop 38 and the Q terminal of the flip-flop 35 is connected to the D input terminal of the flip-flop 38. The NAND gate 36 has its output terminal connected to the LOAD terminal of the counter 23. The Q terminal of the flip-flop 38 is connected via the inverter 39 to the 'B' input terminal of the circuit 40 which has external timing components 42, 43 setting its output pulse length to about 2 seconds. The gate 41 has one input connected to the Q output of the circuit 40 and its other input terminals connected to the output terminal of the inverter 39. The output of gate 41 is connected to the relay amplifier 33 so as to open contact RL1*a* during overrun and for 2 seconds thereafter.

The circuit shown in FIG. 3 detects overrun by determining whether the count reached by the count-up counter 20 has attained a certain minimum value. In non-overrun conditions this overrun count is always exceeded and the output from the AND gate 34 goes positive which clocks the flip-flop 35 and provides a logic 1 on its output Q. This enables the load pulse B from the control logic 21 to be passed forward to the count-down counter 23 and injection pulses are obtained normally. The flip-flop 35 is cleared before each count-up by pulse C. The clear input puts a logic 0 on the output Q of flip-flop 35. Flip-flop 38 transfers to the output Q the complement of output Q of flip-flop 35 when clocked by load pulse B. Hence flip-flop 38 provides a constant output level on output Q of logic 1 during overrun conditions and logic 0 during non-overrun conditions. The output Q of the flip-flop 38 being at a logic 0 at this stage, keeps the relay contact RL1*a* closed in the inverter 39 and gate 41 during non-overrun conditions, When overrun occurs the count required to clock the flip-flop 35 does not occur and the output Q remains at logic 0. This inhibits the load pulse B and no injection pulses are obtained. The fuel is cut off during overrun. The output $\overline{Q}$ of the flip-flop 38 now goes to logic 1 causing the output of the gate 41 to go to logic 1 and thereby opening the contact RL1*a*. At the end of the overrun condition the $\overline{Q}$ output of the flip-flop 38 goes to logic 0 again, but this transition sets the circuit 40 so that its $\overline{Q}$ output goes to 0 for the 2 second interval mentioned. This maintains the exhaust loop inhibition for an extra two seconds after overrun, ensuring that transient conditions set up during overrun have disappeared before exhaust feedback is reestablishes. It will be understood that the delay will ensure that the exhaust gas composition has had time to reach a steady value during this delay, allowing for the time taken for the exhaust gases generated during overrun to be swept away from the sensor.

Turning now to FIG. 4 the exhaust gas sensor circuit will be seen to include three biasing resistors R10, R11 and R12 connected in series between the rails 30 and 31 and the sensor itself is connected in series with another resistor R13 across the resistor R11. The common point of the resistor R13 and the sensor 26 is connected to the invert input terminal of an operational amplifier A2 connected as a comparator with a feedback resistor R14 from its output terminal to its non-inverting input terminal. The non-inverting input terminal is also connected to the common point of two resistors R15 and R16 connected in series between the rails 30 and 31. The output of the amplifier A2 is connected via resistor R18 to the relay RL2 which controls the contact RL2*a* so as to close the contact RL2a whenever the mixture is lean.

Turning now to FIG. 5 there is shown a system in which the engine uses a conventional carburetor 100 through which air enters the air intake 101 of the engine 102. Closed-loop control is obtained by utilising a sensor 103 in the exhaust pipe of the engine and this sensor is, as in FIG. 1, a known element incorporating a heater 104. A circuit identical to that shown in FIG. 4, with the sensor 103 substituted for the sensor 26 therein constitutes an air fuel ratio control 105 and the relay RL2 is used to control the solenoid 106 of a valve 107. In one position of the valve 107 a plenum chamber 108 is connected via a restrictor 109 to atmosphere. In the other position of the valve 107 the plenum chamber is connected via the restrictor 109 to a source of constant vacuum provided by a regulator 110 connected to the engine air intake manifold 101. The plenum chamber 108 is connected to the float chamber of the carburettor so that the fuel flow from the carburetor is modified in accordance with the pressure in the plenum chamber, which itself varies in accordance with the output of the sensor 103. In fact the valve 107, the restrictor 109 and the plenum chamber 108, effectively form in combination an integrator with the plenum chamber 108 forming the equivalent of a capacitor in an electronic analog integrator.

The feedback loop established via the valve 107 is interrupted during overrun conditions by means of a pressure switch 112 which senses the air pressure in the manifold 111. In overrun conditions this pressure becomes very low and the pressure switch 112 closes and, via a monostable circuit 115 energises a solenoid 113 operating a shut off valve 114 between the restrictor 109 and the plenum chamber 108. Thus, in overrun conditions, the pressure in the plenum chamber 108 remains substantially constant, irrespective of the output of the sensor 103, during overrun and for a fixed delay (set by the monostable circuit 115) after the overrun condition has ceased.

The system shown in FIG. 6 is similar in undelying principle to that shown in FIG. 1 except that it makes use of electronic analogue techniques instead of digital techniques. A similar system, but lacking the overrun exhaust feedback interruption and signal storage concept employed herein is described in copending application Serial No. 717,058.

The engine 202 incorporates a mass flow sensor 200 in its air intake 201 exactly the same as that employed in FIG. 1. The output voltage signal therefrom is, however, fed to an analogue integrator 220 with a capacitor 220 *a* and a switch 220*b* for periodically resetting the capacitor. A further switch 221 connects the output of the integrator to a signal storage capacitor 222. The switch 221 is operated periodically (immediately before resetting of the capacitor 220*a*) to permit up-dating of the signal stored on capacitor 222. The signal on capacitor 222 is applied to a bank of voltage comparators 223 which produce output signals at terminal *a* during high engine load conditions, at terminal b in idling conditions and at terminal c in overrun conditions.

Two further switches 224 and 225 which are operated alternately in synchronism with the operation of the switch 221, serve to transfer the integrator output signal to two capacitors 226 and 227 respectively. Two comparators 228 and 229 serve the voltages on the respective capacitor 226 and 227 and their outputs control two sets of injectors via two power amplifiers 230 and 231.

Discharge of the capacitors 226 and 227 is controlled by a controlled current source 234 operation of which is fully explained in application Serial No. 717,058. Normally, provided there is no output at any of the terminals a, b and c and the engine is warm and running normally, the source 234 is controlled by an exhaust feedback control 233. In high engine load, idling, start or warmup conditions, however, exhaust feedback control is inhibited and the signals from terminals a or b, or from a cold start circuit 232 are used to control the source 234.

The exhaust feedback control 233 consists of the sensor circuit of FIG. 4 together with the components $R_3$ to $R_9$, $C_2$ and $A_1$ of FIG. 2, the output voltage of the amplifier $A_1$ providing the input to the source 234. The relay which controls the contacts RL2*a* of FIG. 2 is a relay 235 connected via a monostable circuit 236 to the c output terminal of the comparator bank 223. As in the previous examples the circuit 236 acts to provide a delay in re-establishing the exhaust feedback loop after overrun has ceased. The output c is also connected to disable the comparators 228 and 229.

It will be appreciated that the combination of the capacitor 226, current cource 234 and comparator 228 is functionally equivalent to the combination of the counter 23, and the clock 24 of FIG. 1.

It will be seen that in all the examples described above the overrun detector effectively interrupts the feedback loop and causes a signal storage device in the feedback loop to hold a feedback signal corresponding to that which existed at the instant when overrun commenced. In this way sudden over-fuelling commencing when the overrun condition is terminated is avoided.

We claim:

1. A fuel control system for an internal combustion engine, including a fuel flow control sensitive to at least one engine operating parameter and controlling the rate at which fuel is introduced into the engine, an exhaust gas sensing device for producing an output signal corresponding to the exhaust gas composition, and feedback means for feeding a signal derived from said output signal back to the fuel flow control to correct the fuel flow, wherein the improvement comprises a signal storage device in said feedback means, the stored signal being altered in accordance with variations in the output signal of the exhaust gas sensing device, and overrun detection means connected to said feedback means and arranged to prevent alteration of said stored signal by the exhaust gas sensing device during overrun.

2. A system as claimed in claim 1 in which said overrun detection means includes delay means for extending the period during which alteration of said stored signal is prevented for a predetermined length of time after the overrun condition has ceased.

3. A system as claimed in claim 1 in which the fuel flow control is a pulse length control determining the time for which an injector arranged to direct fuel into the air intake of the engine is open during each engine cycle, means being provided for generating an electrical signal of magnitude dependent on the quantity of fuel to be injected and said overrun detection means being sensitive to the magnitive of said signal.

4. A system as claimed in claim 3 in which said signal generating means is digital and provides a multi-bit digital signal, the fuel flow control including a counter and a clock arranged so that the pulse length is the length of time taken for the counter to be clocked by a number of pulses from the clock corresponding to said multi-bit digital signal, said feedback means varying the clock frequency, said overrun detection means detecting when the multi-bit digital signal is less than a predetermined value.

5. A system as claimed in claim 3 in which said signal generating means comprises an analogue integrator, gate means being provided for periodically transferring the output of the integrator to a capacitive storage device, and said pulse length being determined by the length of time taken to discharge the capacitive storage device via a controlled current source, said feedback means controlling said controlled current source, the overrun detection means detecting when the output of the integrator transferred to the capacitive storage device is loss than a predetermined value.

6. A system as claimed in claim 1 in which said feedback means comprises a switch which is opened and closed by the exhaust gas sensing device in accordance with whether the exhaust gas contains a given constituent is greater, or less than a predetermined quantity, an analogue integrator the input to which is connected to a bias circuit including to said switch so as to be positive or negative according to the state of said switch, said signal storage device being a capacitor forming a part of the integrator, and said overrun detection means acting to disconnect the input of the integrator from the bias circuit.

7. A system as claimed in claim 1 in which the fuel flow control means is a carburettor having a float chamber and pressure control valve controlled by said feed back means and controlling the connection of the float chamber to a vacuum source or to atmosphere, a plenum chamber connected to said float chamber and acting as said signal storage means and further valve means operated by said overrun detection means for shutting off the connection between said first mentioned valve and the plenum chamber during overrun.

8. A system as claimed in claim 7 in which said overrun detection means is a pressure switch sensitive to the vacuum in the air intake of the engine.

* * * * *